No. 626,271. Patented June 6, 1899.
J. P. DALY.
NUT LOCK.
(Application filed Aug. 2, 1898.)
(No Model.)
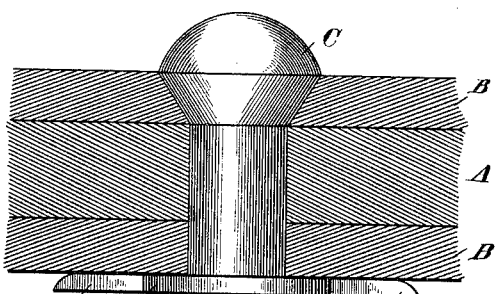
Fig. 1.
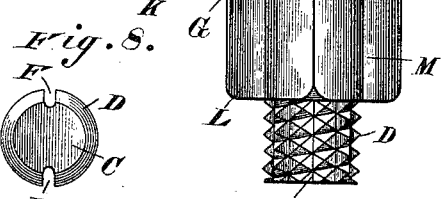
Fig. 8.
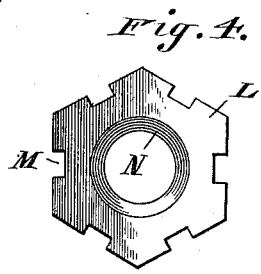
Fig. 4.
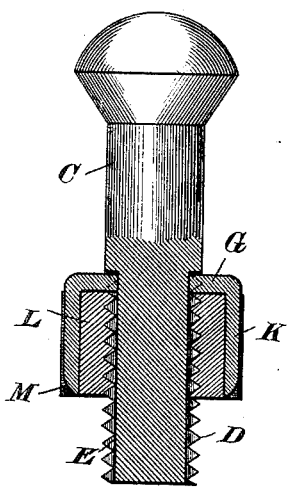
Fig. 2.
Fig. 3.
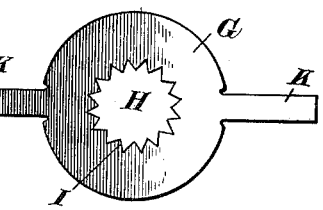
Fig. 5.
Fig. 6.
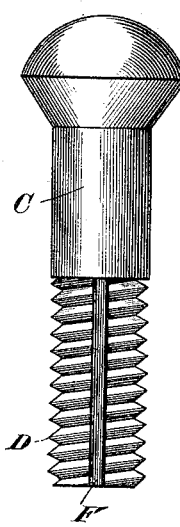
Fig. 7.
Witnesses
F. W. Day
Chas. E. Brock
Inventor
John P. Daly,
by Omar E. —
Attorneys
THE NORRIS PETERS CO., PHOTO-LITHO., WASHINGTON, D. C.

UNITED STATES PATENT OFFICE.

JOHN P. DALY, OF SAVANNAH, GEORGIA, ASSIGNOR OF ONE-HALF TO DANIEL G. PURSE, JR., OF SAME PLACE.

NUT-LOCK.

SPECIFICATION forming part of Letters Patent No. 626,271, dated June 6, 1899.

Application filed August 2, 1898. Serial No. 687,513. (No model.)

*To all whom it may concern:*

Be it known that I, JOHN P. DALY, a citizen of the United States, residing at Savannah, in the county of Chatham and State of Georgia, have invented a new and useful Nut-Lock, of which the following is a specification.

My invention relates to nut-locks especially intended for use in securing railway-joints, but applicable for use in almost any position where a nut and bolt are used to secure two or more parts together.

The object of the invention is to simplify and cheapen such devices and at the same time to render them easy of adjustment into position for securing the nut or removing the same when desired and reliable and lasting.

With these objects in view my invention consists in the improved construction, arrangement, and combination of parts hereinafter fully described and afterward particularly pointed out in the claim.

In order to enable others skilled in the art to which my invention most nearly appertains to make and use the same, I will now proceed to describe its construction and operation, reference being had to the accompanying drawings, in which—

Figure 1 is a horizontal sectional view through the rail and fish-plates of a railway or other objects to be secured together, the bolt, nut, and washer being shown in plan view, with the washer in its flat or inoperative position. Fig. 2 is a view through the nut, washer, and the threaded portion of the bolt in section, the rest of the bolt being shown in plan, the washer being bent into its operative or locking position. Fig. 3 is an end view of the bolt. Fig. 4 is an end view of the nut. Fig. 5 is a view of the washer detached. Fig. 6 is a view of the bolt with but two longitudinal grooves. Fig. 7 is a view of a washer to fit the bolt shown in Fig. 6. Fig. 8 is an end view of the bolt shown in Fig. 6.

Like letters of reference indicate the same parts in all the figures of the drawings.

In the present illustration my invention is shown as applied to secure together a railway-rail and fish-plates, and A represents the web of the railway-rail, and B B the fish-plates.

C indicates the bolt, which is shown as provided with a rounded countersunk head, although, as may be readily understood, the shape of the head of the bolt forms no part of my invention. In Figs. 1, 2, and 3 I have indicated the bolt as provided with threads D, through which are cut a series of V-shaped longitudinal grooves E, while in Figs. 6 and 8 the threads D are intersected by two longitudinal grooves F, which are U-shaped in section. It will, however, be understood that the sectional profile of the grooves may be varied at will without in any wise affecting the invention.

G indicates the washer, which is to be slipped upon the bolt under the nut and must be provided with means for preventing it from turning on the bolt. The construction shown in Fig. 5 is intended to be used upon the bolt shown in Figs. 1, 2, and 3, and the metal around the central opening H is therefore formed into a continuous series of inwardly-pointed teeth I to engage in the series of grooves E. In Fig. 7 but two inwardly-projecting teeth are shown, as at J, which teeth are U-shaped in section to correspond with and fit in the grooves F of the bolt shown in Figs. 6 and 8. The washer is provided with laterally-projecting wings K.

L indicates the nut, which is polygonal in form, having as many sides as are rendered desirable or necessary by the circumstances under which it is used, in this instance being shown as hexagonal. Each flat side is provided with a groove M, and the threads N of the nut are of ordinary construction to engage upon the threads of the bolt, the number of longitudinal grooves cut through the threads of the bolt having no effect whatever upon the action of the nut thereon.

In assembling my invention in use the bolt is passed through the objects to be secured together, with the threaded portion projecting, and the washer in its flat condition, as illustrated in Figs. 5 and 7, is slipped upon the end of the bolt and pushed up into contact with the fish-plate B on that side of the rail, the teeth I, around the central opening H, or the teeth J, as the case may be, fitting in the longitudinal grooves E or F, which will prevent the washer from turning on the bolt.

The nut L is now threaded upon the bolt and turned up tightly against the washer. The laterally-projecting wings K of the washer are now turned outward at right angles to the washer into the grooves M of the nut, which will prevent the nut from turning except when the washer turns. The washer being rigidly held from turning on the bolt by the engagement of the teeth I or J with the grooves E or F and the nut being held against turning independently of the washer by the wings K in the grooves M, it is obvious that neither the nut nor the washer can be turned off the bolt while such engagement continues. To remove the nut, however, it will only be necessary to bend the wings back into line with the washer, thus relieving the nut and permitting it to be turned off the bolt.

While I have illustrated and described the best means now known to me for carrying out my invention, I do not wish to be understood as restricting myself to the exact details of construction shown, but hold that any slight changes or variations, such as might suggest themselves to the ordinary mechanic, would be clearly comprehended within the limit and scope of my invention.

Having thus fully described my invention, what I claim as new, and desire to secure by Letters Patent of the United States, is—

In a nut-lock of the kind described, the combination with a bolt C threaded at D and having a series of V-shaped longitudinal grooves E intersecting the said threads, of the washer G having a central opening H formed with a series of inwardly-projecting teeth I, shaped and arranged to fit into the V-shaped grooves E, said washer also having the laterally-projecting wings K, the nut L having a groove M produced in each side, said nut adapted to be screwed upon the bolt, and down upon the washer, the laterally-projecting wings K being adapted to be bent up into the grooves M, substantially as and for the purposes set forth.

JOHN P. DALY.

Witnesses:
　WM. C. PURSE,
　A. L. STOKES.